Figure 1:
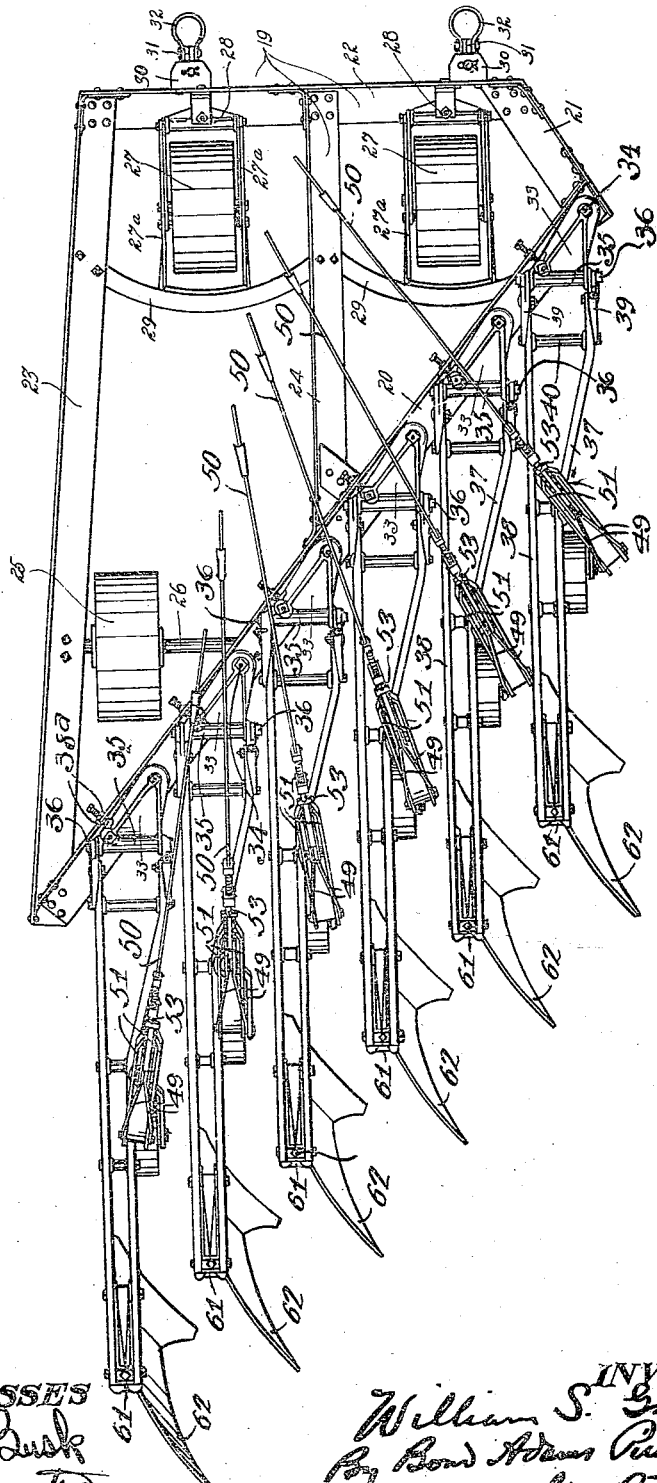

W. S. GRAHAM.
GANG PLOW.
APPLICATION FILED NOV. 1, 1909.

992,495.

Patented May 16, 1911.
3 SHEETS—SHEET 1.

WITNESSES

INVENTOR
William S. Graham
By Bond Adams Pickard Jackson
his Attorneys

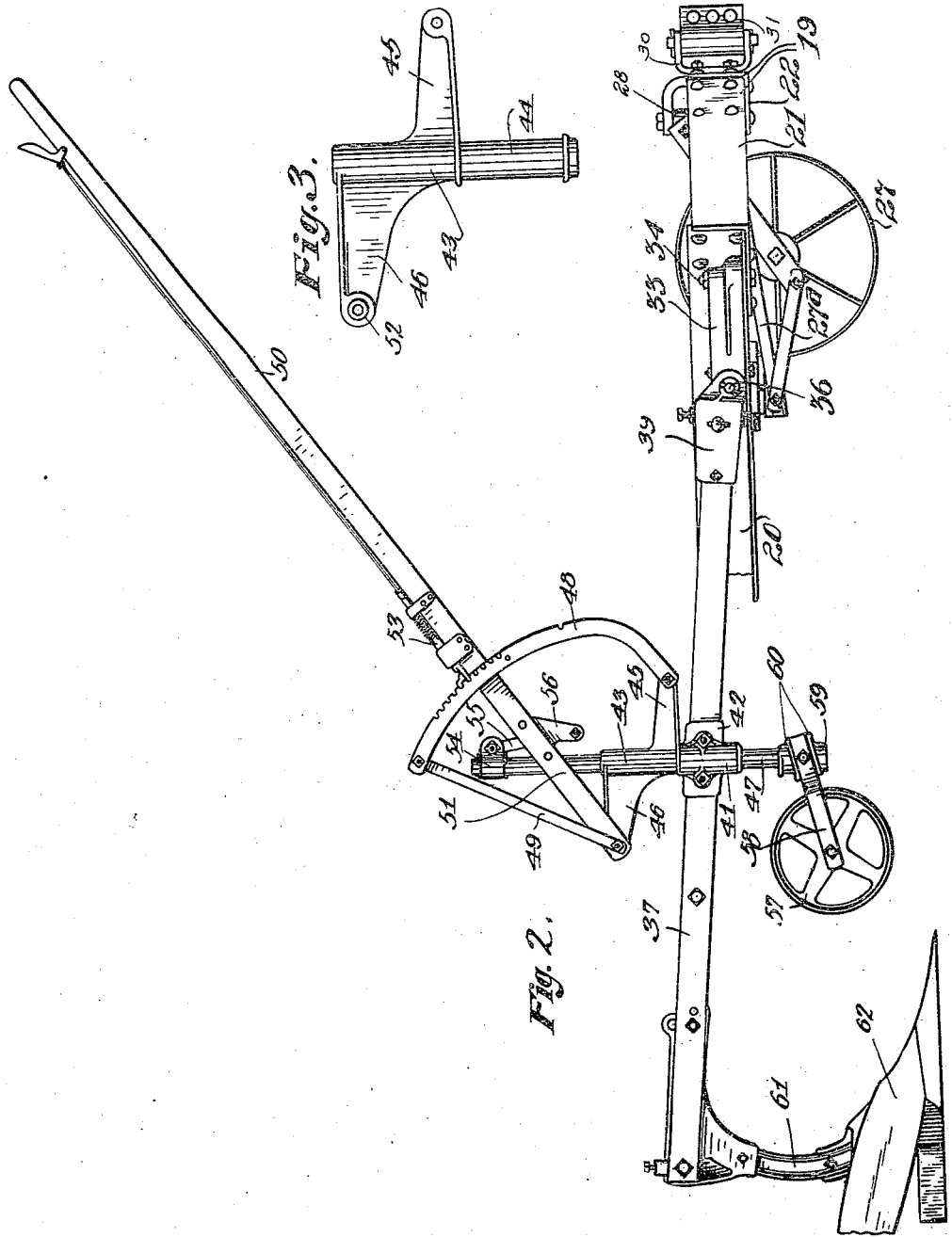

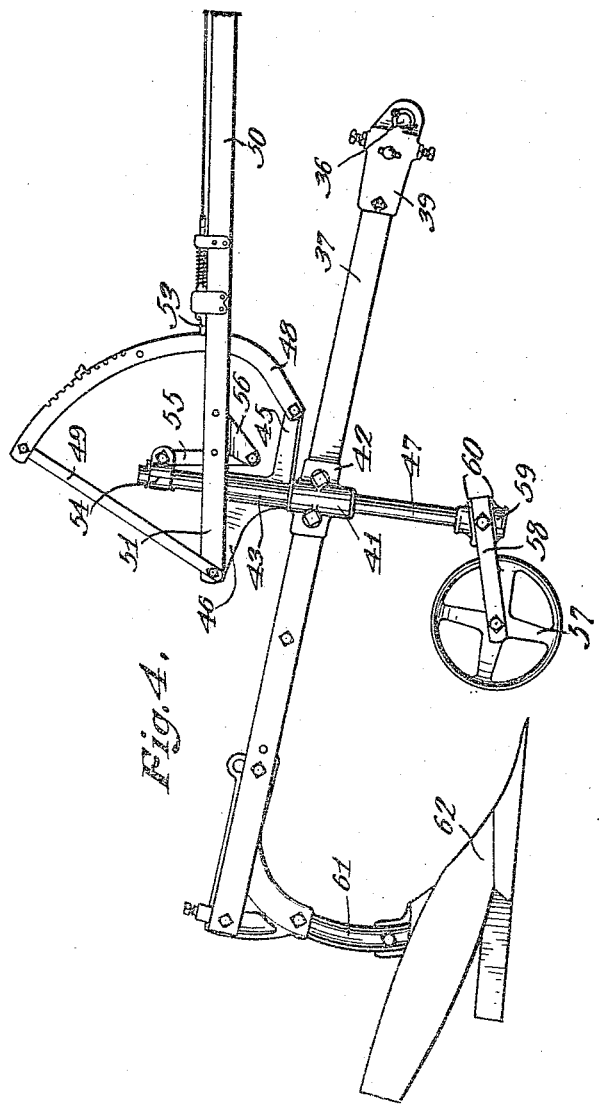

UNITED STATES PATENT OFFICE.

WILLIAM S. GRAHAM, OF CANTON, ILLINOIS, ASSIGNOR TO PARLIN AND ORENDORFF CO., OF CANTON, ILLINOIS, A CORPORATION OF ILLINOIS.

GANG-PLOW.

992,495.      Specification of Letters Patent.      Patented May 16, 1911.

Application filed November 1, 1909. Serial No. 525,720.

*To all whom it may concern:*

Be it known that I, WILLIAM S. GRAHAM, a citizen of the United States, residing at Canton, in the county of Fulton and State of Illinois, have invented certain new and useful Improvements in Gang-Plows, of which the following is a specification, reference being had to the accompanying drawings.

My invention relates to gang plows and particularly to plows in which a plurality of independent plows are connected to a draft frame adapted to be drawn by a traction engine.

One object of my invention is to provide new and improved mechanism for such plows whereby the several levers by which the plows are raised or lowered out of and into the ground may be turned so as to project toward a common center over the draft platform so as to be easily worked by the operator standing on the platform. Heretofore, it has been customary in plows of this class to have the operating levers stand in lines generally parallel to the plow beams, and, as there are a number of these plows on a single machine, this separates the handles of the levers in such a way that it makes it inconvenient and unhandy for one man to operate them.

Another object of my invention is to provide in such plows a gage wheel in front of each plow adapted to caster when the machine is turned. It has been customary in other plows of this character to have the gage wheel held against side swinging. In turning, therefore, the wheel is obliged to slide laterally more or less, tending to strain the plows and the beams and even bend them out of shape.

In the drawings:—Figure 1 is a top or plan view of a plow showing the separate plows, with the platform removed from the draft frame in order to show the working parts. Fig. 2 is a side elevation showing the draft frame and one of the plows with its accompanying operating devices, with the plow in lowered position. Fig. 3 is a side elevation of the sleeve on which the lever and its coöperating devices are mounted. Fig. 4 is a side view of one of the plow beams, operating lever, and attached devices, showing the plow in raised position.

Referring to the drawings:—19 indicates the draft frame as a whole which is composed of rear oblique bar 20, corner bar 21, front cross bar 22, longitudinal bar 23 connecting the front cross bar 22 and the rear end of the oblique bar 20 and set at a slight angle to the line of draft, and of longitudinal brace bar 24 connecting the front bar and oblique bars. These bars are all preferably constructed of angle-iron and rigidly fastened together in any well-known manner, as by corner plates and bolts or rivets.

25 indicates a supporting wheel which is journaled on a shaft 26 supported by bars 23—20.

27 indicates caster wheels which are pivotally supported in any well-known manner, as by brackets 28, on the front bar 22, by means of frames 27ᵃ which extend backward under the curved tracks 29.

30 indicates hitch yokes, 31 the usual clevises, and 32 hitch rings which may be of any well-known type and construction.

33 indicates brackets which are of triangular shape, the hypotenuse of each triangle corresponding generally to the angle of slope of the rear inclined bar 20. At the forward angle of the bracket, the bracket is pivotally supported on the draft bar by means of a bolt 34 which passes through the bracket and the draft bar. The rear side of the bracket 33 is provided with a sleeve 35, preferably integral with the bracket, through which passes a pin 36.

37—38 indicate plow beams whose forward ends are pivotally mounted on the pin 36 by means of couplings 39 of any approved type. The plow beam 38 is preferably straight throughout its entire length, while the beam 37 preferably diverges at its forward end so as to widen the distance between the beams for the purpose of having a sufficiently wide support between the couplings, and said beams are held apart by suitable spreaders, as 40, through which passes one of the bolts which connects the rearward end of the couplings 39 to the respective plow beams.

41—42 indicate clamps by means of which a sleeve 43 is rotatably secured to each of the plow beams 37. The sleeve 43 is provided with a cylindrical portion 44 by means of which it is clamped to the beam 37 by the clamps 41—42, being journaled in said clamps. The sleeve 43 is also provided with a forwardly-projecting arm 45 and a rearwardly-extending arm 46.

47 indicates a standard which is journaled in the sleeve 43 and projects downward therefrom.

48 indicates segmental racks, which, at their lower ends, are bolted to the forward ends of the extension arms 45, one upon each side thereof, and at their upper ends they are connected to brace bars 49 the lower ends of which are connected to the rear extension arms 46.

50 indicates lifting levers whose lower ends 51 are forked, as is best shown in Fig. 1, and are pivotally connected to bosses 52 upon each side of the rearward extending arm 46 of the sleeve 43, a suitable bolt passing through the lower end of braces 49, forked arm 51 of the levers, and arm 46. The levers are provided with the customary spring-bolts 53 operated by the usual hand latches and rods.

54 indicates a collar secured near the upper end of the standards 47 by means of suitable cotter pins.

55 indicates a link, the upper end of which is pivotally connected with the collar 54 and the lower end with a projecting arm 56, rigidly secured to or formed integrally with the forked portion 51 of the lever 50.

57 indicates gage wheels which are journaled upon suitable axles between arms or yoke straps 58.

59 indicates brackets on the lower ends of the standards 47 and provided with suitable flanges 60 between which the forward ends of the yoke straps 58 are secured and which hold the yoke in proper relation to the standard.

61 indicates a suitable standard mounted on the plow beams 37—38, bearing at its lower end a plow 62 of any approved type.

It will be obvious from the above description that by moving the lifting lever the plow may be raised and lowered, the swinging of the lever by means of the connections 54—55, and arm 56, sliding the standard 47 longitudinally of itself in the sleeve 43, whereby, the gage wheel resting upon the ground, the plow may be raised or lowered, as is illustrated in Figs. 2 and 4. At the same time, it will be obvious that this lifting lever and its coöperating mechanism, being mounted upon the sleeve 43 and the sleeve 43 being journaled in the clamps 41—42, the lever may be turned horizontally and set in any desired relation to the plow beam without in any way interfering with its lifting operation. By this means, the several levers of a number of plows may be swung toward a common center so that they may be all easily accessible to and operated by an operator standing on the platform of the draft frame. The lever may be set in any position by tightening the bolts by which the clamping plates secure it to the plow beam. At the same time, the caster wheel being mounted on the standard 47, and the standard 47 being journaled in the sleeve 43, the gage wheel 57 will caster when the plow is turned, the collar 54 being loosely mounted on the top of the standard 47 so that the standard may turn without affecting the position of the lever.

While I have shown each plow mounted independently of all the others and each provided with a lever 71 by which it may be regulated, I do not restrict myself to that specific construction, except as hereinafter claimed, as a plurality of plows might of course be mounted on a single beam and be regulated by a single lever without departing from the spirit of my invention.

What I claim as my invention and desire to secure by Letters Patent is,—

1. In a gang plow, the combination with a draft frame, a plurality of plow beams pivotally connected with said frame and adapted to be raised and lowered on said pivotal connections relative to said frame, and plows carried by said plow beams, of a gage wheel mounted on each of said plow beams in advance of said plow and adapted to turn thereon on a vertical pivot, and a lever connected with each gage wheel by the operation of which lever the beam and the plow carried thereby may be raised relative to the gage wheel whereby the plow is lifted out of the ground.

2. In a gang plow, the combination with a draft frame, a plurality of plow beams connected with said frame, and plows carried by said plow beams, of a gage wheel mounted on each of said plow beams in advance of said plow and adapted to turn thereon on a vertical pivot, and a lever connected with each of said gage wheels by the operation of which lever said wheel may be raised or lowered relative to its beam, each of said levers being adapted to swing about a vertical axis whereby the free ends of said levers may be turned toward a common position over said frame.

3. In a gang plow, in combination, a draft frame, a plurality of beams connected with said draft frame, plows on said plow beams, and a lifting lever for each plow beam adapted to swing about a vertical axis whereby the free ends of said levers may be turned toward a common position over said frame.

4. In a gang plow, in combination, a draft frame, a plurality of plow beams connected with said draft frame, a plurality of plows on said plow beams, and a plurality of lifting levers by the movement of which said plow beams are adapted to be elevated, each of said levers being adapted to swing about a vertical axis whereby the free ends of said levers may be turned toward a common position over said frame.

5. In a gang plow, in combination, a draft frame, a plurality of beams connected with said draft frame, plows on said plow beams, a standard mounted on each of said plow beams and movable therein longitudinally of itself, a lever, and co-acting lifting mechanism carried by each of said plow beams and horizontally-rotatable thereon whereby the free ends of said levers may be swung toward a common center over said frame, said lever and co-acting devices being adapted by their coöperation to move said standards longitudinally of themselves on said plow beams.

6. In a gang plow, in combination, a draft frame, a plurality of beams connected with said draft frame, plows on said plow beams, a sleeve rotatably carried on each of said plow beams, a standard journaled in said sleeve and movable longitudinally of itself therein, a gage wheel carried on the lower end of said standard, a lever and coöperating devices mounted on said sleeve, and connections between said lever and said standard, adapted when said lever is moved to move said standard longitudinally of itself in said sleeve.

WILLIAM S. GRAHAM.

Witnesses:
WILLIAM M. CAVES,
S. N. ARNOLD.

Copies of this patent may be obtained for five cents each, by addressing the "Commissioner of Patents, Washington, D. C."